United States Patent
Imamura et al.

(10) Patent No.: US 10,112,601 B2
(45) Date of Patent: Oct. 30, 2018

(54) DRIVING DEVICE FOR A HYBRID VEHICLE

(75) Inventors: Tatsuya Imamura, Okazaki (JP); Atsushi Tabata, Okazaki (JP); Tooru Matsubara, Toyota (JP); Kenta Kumazaki, Toyota (JP); Yasuhiro Hiasa, Toyota (JP); Tsuyoshi Kitahata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 879 days.

(21) Appl. No.: 14/411,308

(22) PCT Filed: Jun. 27, 2012

(86) PCT No.: PCT/JP2012/066429
§ 371 (c)(1),
(2), (4) Date: Dec. 29, 2014

(87) PCT Pub. No.: WO2014/002219
PCT Pub. Date: Jan. 3, 2014

(65) Prior Publication Data
US 2015/0183422 A1 Jul. 2, 2015

(51) Int. Cl.
*B60W 20/40* (2016.01)
*B60W 30/192* (2012.01)
(Continued)

(52) U.S. Cl.
CPC ............. *B60W 20/40* (2013.01); *B60K 6/445* (2013.01); *B60W 10/06* (2013.01); *B60W 10/08* (2013.01); *B60W 10/115* (2013.01); *B60W 30/192* (2013.01); *F16H 3/728* (2013.01); *B60W 2710/06* (2013.01); *B60W 2710/0661* (2013.01);
(Continued)

(58) Field of Classification Search
CPC .... B60W 30/192; B60W 20/40; B60W 20/30; B60W 10/11; B60W 10/115; B60W 10/08; B60W 10/06
See application file for complete search history.

(56) References Cited

U.S. PATENT DOCUMENTS 6,258,006 B1   7/2001  Hanyu et al.
6,380,640 B1   4/2002  Kanamori et al.
(Continued)

FOREIGN PATENT DOCUMENTS

JP   2009 190694   8/2009
JP   2010 173381   8/2010

OTHER PUBLICATIONS

International Search Report dated Jul. 31, 2012 in PCT/JP12/066429 Filed Jun. 27, 2012.

*Primary Examiner* — Erin D Bishop
(74) *Attorney, Agent, or Firm* — Oblon, McClelland, Maier & Neustadt, L.L.P.

(57) ABSTRACT

A driving device for a hybrid vehicle includes a transmission unit configured to output a rotation of an engine while changing rotating speed of the engine; and a first rotating electric machine. The first rotating electric machine is configured to supply a torque for increasing the rotating speed of the engine at the time of starting up of the engine to the engine through the transmission unit. At the time of starting up of the engine, the gear shift stage of the transmission unit is switched to an overdrive state. Thus, a torque sufficient for starting up of the engine can be supplied to the engine, and hence the engine can be appropriately started up.

14 Claims, 10 Drawing Sheets

(51) Int. Cl.
*B60K 6/445* (2007.10)
*B60W 10/08* (2006.01)
*B60W 10/06* (2006.01)
*B60W 10/115* (2012.01)
*F16H 3/72* (2006.01)
*F16H 37/08* (2006.01)

(52) U.S. Cl.
CPC ..... *B60W 2710/08* (2013.01); *B60W 2710/10* (2013.01); *B60W 2710/1038* (2013.01); *F16H 3/725* (2013.01); *F16H 2037/0873* (2013.01); *F16H 2200/0043* (2013.01); *F16H 2200/201* (2013.01); *F16H 2200/2007* (2013.01); *F16H 2200/2035* (2013.01); *F16H 2200/2046* (2013.01); *Y02T 10/6239* (2013.01); *Y02T 10/6286* (2013.01); *Y10S 903/902* (2013.01); *Y10T 477/23* (2015.01)

(56) References Cited

U.S. PATENT DOCUMENTS

| | | |
|---|---|---|
| 8,506,450 B2 | 8/2013 | Nakasako |
| 2010/0012405 A1 | 1/2010 | Katsuta et al. |

| | | | | CL1 | BK1 | MG1 | MG2 |
|---|---|---|---|---|---|---|---|
| EV | FORWARD MOVEMENT/ BACKWARD MOVEMENT | SINGLE DRIVE | DRIVE | | | G | M |
| | | | SIMULTANEOUS USE OF ENGINE BRAKE | △ | △ | G | M |
| | | DUAL DRIVE | | ○ | ○ | M | M |
| HV | FORWARD MOVEMENT | HIGH | | | ○ | G | M |
| | | LOW | | ○ | | G | M |
| | BACKWARD MOVEMENT | LOW | | ○ | | G | M |

○: ENGAGEMENT     △: ENGAGEMENT OF ANY ONE OF COMPONENTS IN SIMULTANEOUS USE OF ENGINE BRAKE
G: MAINLY GENERATOR     M: MAINLY MOTOR, BUT GENERATOR AT REGENERATION TIME

FIG.14

|  | Ct1 | Ct2 | Bt1 | Bt2 |
|---|---|---|---|---|
| 1st, R | O |  |  | O |
| 2nd | O |  | O |  |
| 3rd | O | O |  |  |
| 4th |  | O | O |  |
| N |  |  |  |  |

O: ENGAGEMENT

FIG.15

|  |  |  | CL1 | BK1 | MG |
|---|---|---|---|---|---|
| EV | FORWARD MOVEMENT/ BACKWARD MOVEMENT | DRIVE |  |  | M |
|  |  | SIMULTANE-OUS USE OF ENGINE BRAKE | △ | △ | G |
| HV | FORWARD MOVEMENT | HIGH |  | O | M |
|  |  | LOW | O |  | M |
|  | BACKWARD MOVEMENT | LOW | O |  | M |

O: ENGAGEMENT  △: ENGAGEMENT OF ANY ONE OF COMPONENTS IN SIMULTANEOUS USE OF ENGINE BRAKE
G: MAINLY GENERATOR  M: MAINLY MOTOR, BUT GENERATOR AT REGENERATION TIME

DRIVING DEVICE FOR A HYBRID VEHICLE

FIELD

The present invention relates to a driving device for a hybrid vehicle.

BACKGROUND

Hitherto, a hybrid vehicle including a transmission mechanism is known. For example, Patent Literature 1 discloses a technique of a driving device for a hybrid vehicle including a transmission mechanism which transmits a rotation of an internal-combustion engine to a power distribution mechanism while changing the rotation thereof, a first transmission shaft which transmits power from the internal-combustion engine to the transmission mechanism, and a second transmission shaft which transmits power output from the transmission mechanism to the power distribution mechanism.

CITATION LIST

Patent Literature

Patent Literature 1: Japanese Patent Application Laid-open No. 2009-190694

SUMMARY

Technical Problem

In the hybrid vehicle including the transmission mechanism capable of changing the rotation of the engine, there is a room for improvement in the appropriate start-up of the stopped engine when the engine is stopped and a travel mode is switched from an EV travel mode of using a rotating electric machine as a power source to a hybrid travel mode of using the engine and the rotating electric machine as power sources. Although there is a need to increase the rotating speed of the engine by the rotating electric machine in order to start up the engine, a problem arises in that the torque necessary at this time increases.

The present invention is made in view of the above-described circumstances, and an object thereof is to provide a driving device for a hybrid vehicle capable of appropriately starting up an engine.

Solution to Problem

In order to solve the above mentioned problem, a driving device for a hybrid vehicle according to the present invention, includes a transmission unit configured to be able to output a rotation of an engine while changing rotating speed of the engine; and a rotating electric machine, wherein the rotating electric machine is configured to supply a torque for increasing the rotating speed of the engine at the time of starting up of the engine to the engine through the transmission unit, and the transmission unit is switched to a high speed gear shift stage at the time of starting up of the engine.

Further, the driving device for a hybrid vehicle preferably further includes a differential unit configured to connect the transmission unit to drive wheels; and a second rotating electric machine, wherein an output shaft of the engine is preferably connected to an input component of the transmission unit, and the differential unit preferably includes a first rotation component connected to an output component of the transmission unit, a second rotation component connected to the rotating electric machine, and a third rotation component connected to the second rotating electric machine and the drive wheels.

Further, in the driving device for a hybrid vehicle, it is preferable that the transmission unit is switched to the high speed gear shift stage at the time of starting up of the engine in a high load state of the rotating electric machine.

Further, in the driving device for a hybrid vehicle, it is preferable that the high speed gear shift stage is an overdrive state.

Further, in the driving device for a hybrid vehicle, it is preferable that the transmission unit is capable of switching the gear shift stage by an engagement or a release of an engagement component, and a state where the transmission unit is preferably switched to the high speed gear shift stage includes a slip engagement state of the engagement component.

Further, in the driving device for a hybrid vehicle, it is preferable that the high load state of the rotating electric machine is a state where a high torque is used while the vehicle travels by using the rotating electric machine.

Further, in the driving device for a hybrid vehicle, it is preferable that the high load state of the rotating electric machine is a state where a high damping torque is needed while the vehicle travels by using the rotating electric machine.

Further, in the driving device for a hybrid vehicle, it is preferable that the high load state of the rotating electric machine is a state where a high damping torque is needed after the starting up of the engine.

Further, in the driving device for a hybrid vehicle, it is preferable that the transmission unit is switched to a gear shift stage which is used while the vehicle travels by using the engine after the transmission unit is switched to the high speed gear shift stage and the engine is started up.

Advantageous Effects of Invention

In the driving device for a hybrid vehicle according to the present invention, since the transmission unit is switched to the high speed gear shift stage, the rotating speed of the engine can be increased at a low torque in the case of the transmission unit, and hence the torque necessary for the start-up of the engine can be decreased. Therefore, it is possible to supply a torque sufficient for starting up the engine, and hence there is an advantage that the engine can be appropriately started up.

BRIEF DESCRIPTION OF DRAWINGS

FIG. 14 is a diagram illustrating an engagement table of a second transmission unit of a driving device for a hybrid vehicle according to the modified example of the embodiment.

FIG. 15 is a diagram illustrating an operation engagement table of a first transmission unit of the driving device for a hybrid vehicle according to the modified example of the embodiment.

DESCRIPTION OF EMBODIMENTS

Figure 1:
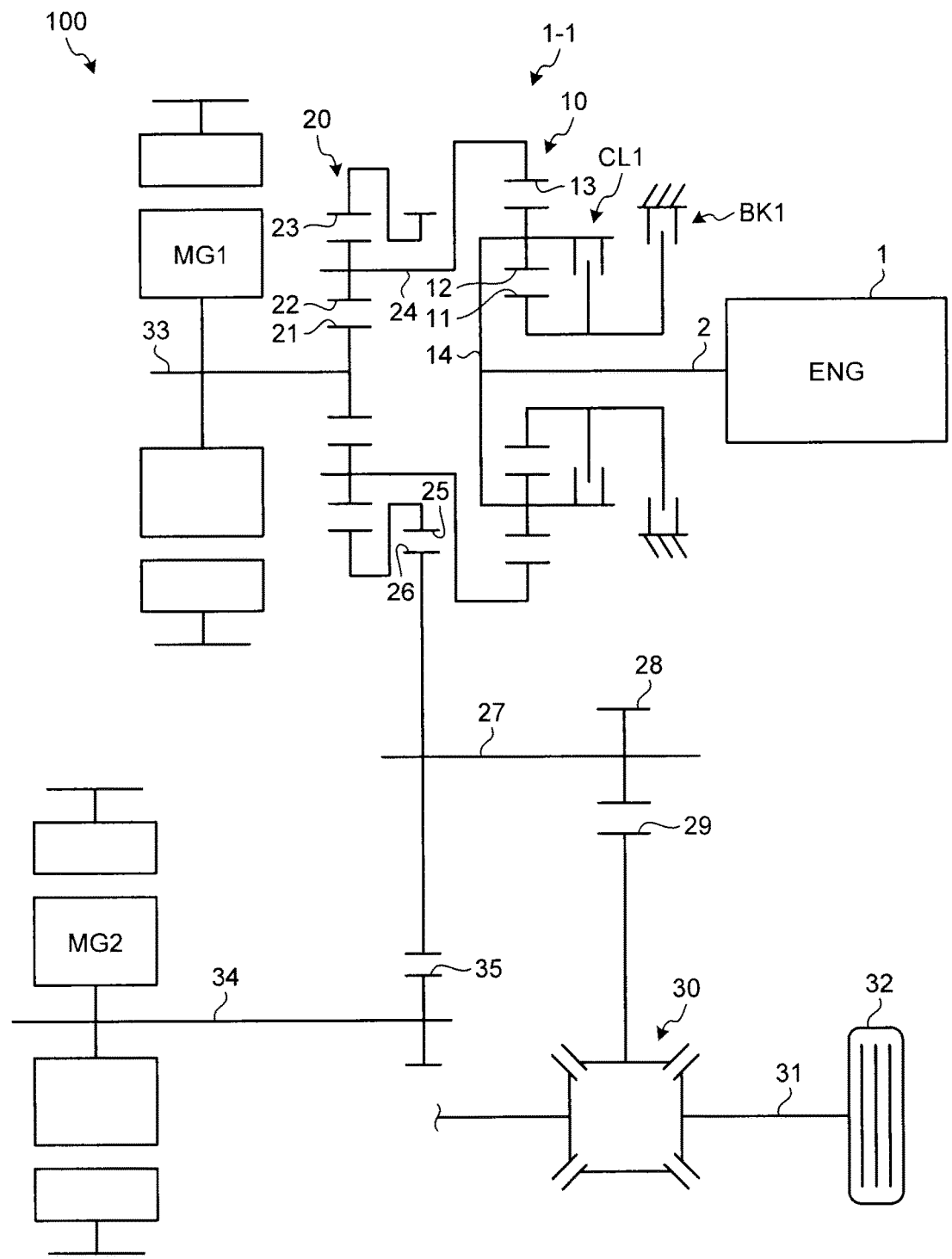
FIG. 1 is a skeleton diagram of a vehicle according to an embodiment.

Hereinafter, an embodiment of a driving device for a hybrid vehicle according to the present invention will be described with reference to the drawings.

Furthermore, the same reference signs will be given to the same or equivalent components in the drawings below, and the description thereof will not be repeated.

Embodiment

Figures 2, 3:
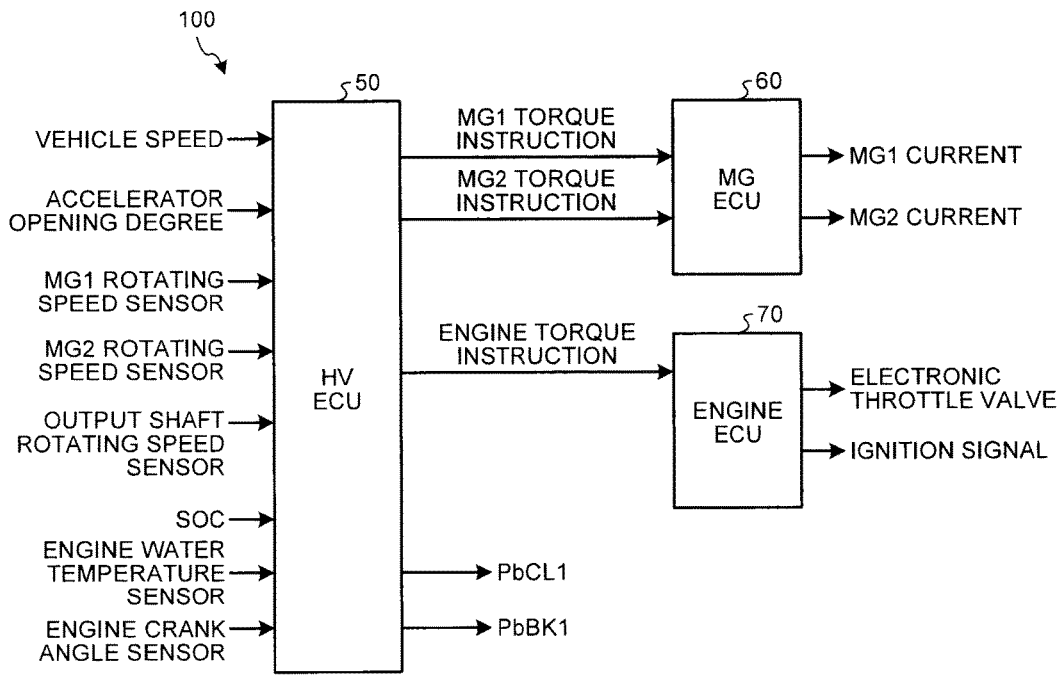
FIG. 2 is a diagram illustrating an input/output relation of the vehicle according to the embodiment.
FIG. 3 is a diagram illustrating an operation engagement table of a driving device for a hybrid vehicle according to the embodiment.

Referring to FIGS. 1 to 12, an embodiment of the present invention will be described. FIG. 1 is a skeleton diagram of a vehicle according to the embodiment, and FIG. 2 is a diagram illustrating an input/output relation of the vehicle according to the embodiment.

A vehicle 100 according to the embodiment is a hybrid vehicle which includes an engine 1, a first rotating electric machine MG1, and a second rotating electric machine MG2 as power sources. The vehicle 100 may be a plug-in hybrid vehicle that can be charged by an external power supply. As illustrated in FIGS. 1 and 2, the vehicle 100 includes an engine 1, a first planetary gear mechanism 10, a second planetary gear mechanism 20, the first rotating electric machine MG1, the second rotating electric machine MG2, a clutch CL1, a brake BK1, an HV_ECU 50, an MG_ECU 60, and an engine_ECU 70.

Further, a driving device 1-1 for a hybrid vehicle according to the embodiment includes the first planetary gear mechanism 10, the second planetary gear mechanism 20, the clutch CL1, and the brake BK1. The driving device 1-1 for a hybrid vehicle may further include control devices such as ECUs 50, 60, and 70. The driving device for the hybrid vehicle 1-1 can be applied to an FF (Front Engine Front Drive) vehicle or an RR (Rear Engine Rear Drive) vehicle. The driving device for the hybrid vehicle 1-1 is mounted on the vehicle 100, for example, so that the axial direction is the vehicle width direction.

In the driving device for the hybrid vehicle 1-1 according to the embodiment, a transmission unit includes the first planetary gear mechanism 10, the clutch CL1, and the brake BK1. Further, a differential unit includes the second planetary gear mechanism 20. Further, a switching device which shifts the first planetary gear mechanism 10 includes the clutch CL1 and the brake BK1.

The engine 1 converts the combustion energy of fuel into the rotational movement of the output shaft, and outputs the rotational movement. The output shaft of the engine 1 is connected to an input shaft 2. The input shaft 2 is an input shaft of a power transmission device. The power transmission device includes the first rotating electric machine MG1, the second rotating electric machine MG2, the clutch CL1, the brake BK1, a differential device 30, and the like. The input shaft 2 is disposed so as to be coaxial with the output shaft of the engine 1 and is disposed on the extension line of the output shaft. The input shaft 2 is connected to a first carrier 14 of the first planetary gear mechanism 10.

The first planetary gear mechanism 10 of the embodiment corresponds to a first differential mechanism which is connected to the engine 1 and transmits the rotation of the engine 1. Here, the first planetary gear mechanism 10 as a differential mechanism is exemplified as an example of the power transmission mechanism. The first planetary gear mechanism 10 is mounted as a first differential mechanism onto the vehicle 100. The first planetary gear mechanism 10 is an input side differential mechanism which is disposed near the engine 1 in relation to the second planetary gear mechanism 20. The first planetary gear mechanism 10 can change the speed of the rotation of the engine 1 and can output the rotation. The first planetary gear mechanism 10 is of a single pinion type, and includes a first sun gear 11, a first pinion gear 12, a first ring gear 13, and the first carrier 14.

The first ring gear 13 is disposed so as to be coaxial with the first sun gear 11 and is disposed at the outside of the first sun gear 11 in the radial direction. The first pinion gear 12 is disposed between the first sun gear 11 and the first ring gear 13, and engages with the first sun gear 11 and the first ring gear 13. The first pinion gear 12 is rotatably supported by the first carrier 14. The first carrier 14 is connected to the input shaft 2, and rotates along with the input shaft 2. Accordingly, the first pinion gear 12 can rotate (revolve) about the center axis of the input shaft 2 along with the input shaft 2 and can rotate (spin) about the center axis of the first pinion gear 12 while being supported by the first carrier 14.

The clutch CL1 is a clutch device which can connect the first sun gear 11 to the first carrier 14. The clutch CL1 may be, for example, a friction engagement type clutch, but it is not limited thereto. For example, a clutch device such as an engagement type clutch may be used as the clutch CL1. The clutch CL1 is driven by, for example, a hydraulic pressure so as to be engaged or released. The clutch CL1 in the full engagement state can connect the first sun gear 11 to the first carrier 14 so that the first sun gear 11 and the first carrier 14 rotate together. The clutch CL1 in the full engagement state regulates the differential operation of the first planetary gear mechanism 10. Meanwhile, the clutch CL1 in the released state separates the first sun gear 11 from the first carrier 14 so that the relative rotation between the first sun gear 11 and the first carrier 14 is allowed. That is, the clutch CL1 in the released state allows the differential operation of the first planetary gear mechanism 10. Furthermore, the clutch CL1 can be controlled in a half engagement state (the slip engagement state).

The brake BK1 is a brake device which can regulate the rotation of the first sun gear 11. The brake BK1 includes an engagement component which is connected to the first sun gear 11 and an engagement component which is connected to a vehicle body side, for example, the casing of the power transmission device. The brake BK1 can be configured as the friction engagement type clutch device of the clutch CL1, but the present invention is not limited thereto. For example, a clutch device such as an engagement type clutch may be used as the brake BK1. The brake BK1 is driven by, for example, a hydraulic pressure so as to be engaged or released. The brake BK1 in the full engagement state connects the first sun gear 11 to the vehicle body so that the rotation of the first sun gear 11 can be regulated. Meanwhile, the brake BK1 in the released state separates the first sun gear 11 from the vehicle body so that the rotation of the first sun gear 11 is allowed. Furthermore, the brake BK1 can be controlled in the half engagement state (the slip engagement state).

The second planetary gear mechanism 20 of the embodiment corresponds to a differential mechanism which connects the first planetary gear mechanism 10 to a drive wheel 32. The second planetary gear mechanism 20 is mounted as a second differential mechanism onto the vehicle 100. The second planetary gear mechanism 20 is an output side differential mechanism which is disposed at the side of the drive wheel 32 in relation to the first planetary gear mechanism 10. The second planetary gear mechanism 20 is of a single pinion type, and includes a second sun gear 21, a second pinion gear 22, a second ring gear 23, and a second carrier 24. The second planetary gear mechanism 20 is disposed so as to be coaxial with the first planetary gear mechanism 10 and is disposed so as to face the engine 1 with the first planetary gear mechanism 10 interposed therebetween.

The second ring gear 23 is disposed so as to be coaxial with the second sun gear 21 and is disposed at the outside of the second sun gear 21 in the radial direction. The second pinion gear 22 is disposed between the second sun gear 21 and the second ring gear 23, and engages with the second sun gear 21 and the second ring gear 23. The second pinion gear 22 is rotatably supported by the second carrier 24. The second carrier 24 is connected to the first ring gear 13, and rotates along with the first ring gear 13. The second pinion gear 22 can rotate (revolve) about the center axis of the input shaft 2 along with the second carrier 24 and may rotate (spin) about the center axis of the second pinion gear 22 while being supported by the second carrier 24. The first ring gear 13 is an output component of the first planetary gear mechanism 10, and can output the rotation, input from the engine 1 to the first planetary gear mechanism 10, to the second carrier 24. The second carrier 24 corresponds to a first rotation component connected to the output component of the first planetary gear mechanism 10.

A rotation shaft 33 of the first rotating electric machine MG1 is connected to the second sun gear 21. The rotation shaft 33 of the first rotating electric machine MG1 is disposed so as to be coaxial with the input shaft 2 and rotates along with the second sun gear 21. The second sun gear 21 corresponds to a second rotation component connected to the first rotating electric machine MG1. A counter drive gear 25 is connected to the second ring gear 23. The counter drive gear 25 is an output gear which rotates along with the second ring gear 23. The second ring gear 23 corresponds to a third rotation component which is connected to the second rotating electric machine MG2 and the drive wheel 32. The second ring gear 23 is an output component which can output the rotation input from the first rotating electric machine MG1 or the first planetary gear mechanism 10 to the drive wheel 32.

The counter drive gear 25 engages with a counter driven gear 26. The counter driven gear 26 is connected to a drive pinion gear 28 through a counter shaft 27. The counter driven gear 26 and the drive pinion gear 28 rotate together. Further, a reduction gear 35 engages with the counter driven gear 26. The reduction gear 35 is connected to a rotation shaft 34 of the second rotating electric machine MG2. That is, the rotation of the second rotating electric machine MG2 is transmitted to the counter driven gear 26 through the reduction gear 35. The reduction gear 35 has a diameter smaller than the counter driven gear 26, and transmits the rotation of the second rotating electric machine MG2 to the counter driven gear 26 while the rotating speed is decreased.

The drive pinion gear 28 engages with a differential ring gear 29 of the differential device 30. The differential device 30 is connected to drive wheels 32 through left and right drive shafts 31. The second ring gear 23 is connected to the drive wheel 32 through the counter drive gear 25, the counter driven gear 26, the drive pinion gear 28, the differential device 30, and the drive shaft 31. Further, the second rotating electric machine MG2 is connected to the power transmission line between the second ring gear 23 and the drive wheel 32, and can transmit power to the second ring gear 23 and the drive wheel 32.

Each of the first rotating electric machine MG1 and the second rotating electric machine MG2 has a function of a motor (an electric rotating machine) and a function of a generator. The first rotating electric machine MG1 and the second rotating electric machine MG2 are connected to a battery through an inverter. The first rotating electric machine MG1 and the second rotating electric machine MG2 can output the electric power supplied from the battery while the electric power is converted into mechanical power and can convert the mechanical power into electric power while being driven by the power input thereto. The electric power which is generated by the rotating electric machines MG1 and MG2 can be stored in the battery. As the first rotating electric machine MG1 and the second rotating electric machine MG2, for example, an AC synchronization type motor generator can be used.

In the vehicle 100 of the embodiment, the brake BK1, the clutch CL1, the first planetary gear mechanism 10, the counter drive gear 25, the second planetary gear mechanism 20, and the first rotating electric machine MG1 are disposed in this order from the engine 1 so as to be coaxial with the engine 1. Further, the driving device 1-1 for a hybrid vehicle of the embodiment is of a multi-axial type in which the input shaft 2 and the rotation shaft 34 of the second rotating electric machine MG2 are disposed on different axes.

As illustrated in FIG. 2, the vehicle 100 includes the HV_ECU 50, the MG_ECU 60, and the engine_ECU 70. Each of the ECUs 50, 60, and 70 is an electronic control unit including a computer. The HV_ECU 50 has a function of controlling the entire vehicle 100. The MG_ECU 60 and the engine_ECU 70 are electrically connected to the HV_ECU 50.

The MG_ECU 60 can control the first rotating electric machine MG1 and the second rotating electric machine MG2. For example, the MG_ECU 60 can control the output torque of the first rotating electric machine MG1 by adjusting the value of the current supplied to the first rotating electric machine MG1 and can control the output torque of the second rotating electric machine MG2 by adjusting the value of the current supplied to the second rotating electric machine MG2.

The engine_ECU 70 can control the engine 1. For example, the engine_ECU 70 can control the opening degree of the electronic throttle valve of the engine 1, can control the ignition of the engine 1 by outputting an ignition signal, and can control the injection of the fuel to the engine 1. The engine_ECU 70 can control the output torque of the engine 1 by the control of the opening degree of the electronic throttle valve, the control of the injection, and the control of the ignition.

A vehicle speed sensor, an acceleration opening degree sensor, an MG1 rotating speed sensor, an MG2 rotating speed sensor, an output shaft rotating speed sensor, a battery (SOC) sensor, an engine water temperature sensor, an engine crank angle sensor, and the like are connected to the HV_ECU 50. By these sensors, the HV_ECU 50 can acquire the vehicle speed, the accelerator opening degree, the rotating speed of the first rotating electric machine MG1, the rotating speed of the second rotating electric machine MG2, the rotating speed of the output shaft of the power transmission device, the battery state SOC, the engine water temperature, the engine crank angle, and the like.

The HV_ECU 50 can calculate a required driving force, a required power, a required torque, and the like for the vehicle 100 based on the acquired information. The HV_ECU 50 determines the output torque (hereinafter, referred to as the "MG1 torque") of the first rotating electric machine MG1, the output torque (hereinafter, referred to as the "MG2 torque") of the second rotating electric machine MG2, and the output torque (hereinafter, referred to as the "engine torque") of the engine 1 based on the calculated required values. The HV_ECU 50 outputs an MG1 torque instruction value and an MG2 torque instruction value to the MG_ECU 60. Further, the HV_ECU 50 outputs an engine torque instruction value to the engine_ECU 70.

The HV_ECU 50 controls each of the clutch CL1 and the brake BK1 based on the travel mode and the like described later. The HV_ECU 50 outputs an instruction value (PbCL1) of a hydraulic pressure supplied to the clutch CL1 and an instruction value (PbBK1) of a hydraulic pressure supplied to the brake BK1. The hydraulic control device (not illustrated) controls the oil pressure supplied to the clutch CL1 and the brake BK1 in response to the instruction values PbCL1 and PbBK1.

FIG. 3 is a diagram illustrating the operation engagement table of the driving device 1-1 for a hybrid vehicle according to the embodiment. The vehicle 100 can selectively perform a hybrid (HV) travel mode or an EV travel mode. The HV travel mode indicates a travel mode which causes the vehicle 100 to travel by using the engine 1 as the power source. In the HV travel mode, the second rotating electric machine MG2 may be used as the power source in addition to the engine 1.

The EV travel mode is a travel mode which causes the vehicle to travel by using at least one of the first rotating electric machine MG1 and the second rotating electric machine MG2 as the power source. In the EV travel mode, the vehicle can travel while the engine 1 is stopped. As the EV travel mode, the driving device 1-1 for a hybrid vehicle according to the embodiment includes a single motor EV mode (a single drive EV mode) which causes the vehicle 100 to travel by using the second rotating electric machine MG2 as a single power source and a dual motor EV mode (a dual drive EV mode) which causes the vehicle 100 to travel by using the first rotating electric machine MG1 and the second rotating electric machine MG2 as the power sources.

Figure 4:
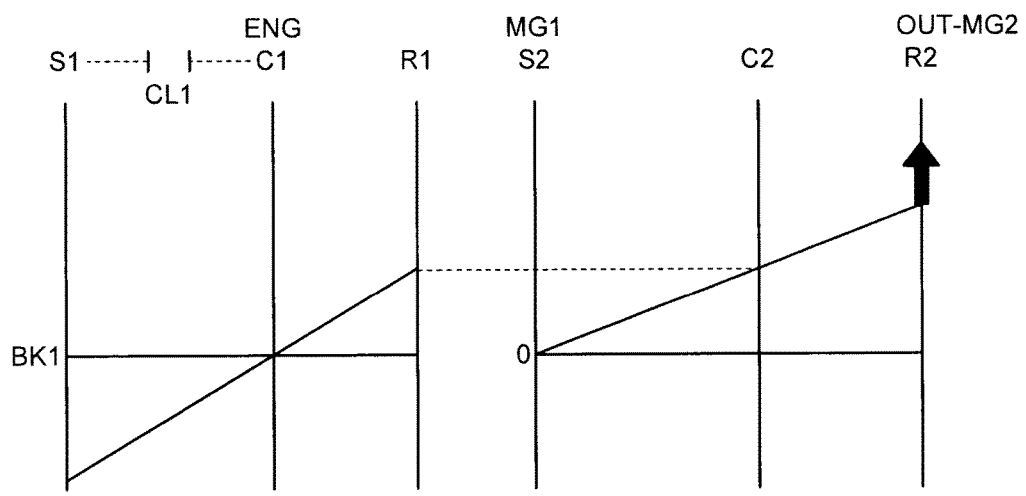
FIG. 4 is an alignment chart according to a single motor EV mode.

In the engagement table of FIG. 3, the circle of the sections of the clutch CL1 and the brake BK1 indicates the engagement state, and the blank indicates the released state. Further, the triangle indicates a state where any one of the clutch CL1 and the brake BK1 is engaged and the other thereof is released. The single motor EV mode is performed while, for example, both the clutch CL1 and the brake BK1 are released. FIG. 4 is an alignment chart according to the single motor EV mode. In the alignment chart, Reference Signs S1, C1, R1 respectively indicate the first sun gear 11, the first carrier 14, and the first ring gear 13, and Reference Signs S2, C2, and R2 respectively indicate the second sun gear 21, the second carrier 24, and the second ring gear 23.

In the single motor EV mode, the clutch CL1 and the brake BK1 are released. When the brake BK1 is released, the rotation of the first sun gear 11 is allowed. Meanwhile, when the clutch CL1 is released, the differential operation of the first planetary gear mechanism 10 is allowed. The HV_ECU 50 generates a driving force in the vehicle 100 in the forward moving direction by outputting a positive torque to the second rotating electric machine MG2 through the MG_ECU 60. The second ring gear 23 rotates normally along with the rotation of the drive wheel 32. Here, the normal rotation is set as the rotation direction of the second ring gear 23 when the vehicle 100 moves forward. The HV_ECU 50 reduces the dragging loss by operating the first rotating electric machine MG1 as a generator. Specifically, the HV_ECU 50 generates power by applying a slight torque to the first rotating electric machine MG1, and sets the rotating speed of the first rotating electric machine MG1 to zero. Thus, the dragging loss of the first rotating electric machine MG1 can be reduced. Further, when the MG1 rotating speed can be maintained at zero by using a cogging torque even when the MG1 torque is zero, the MG1 torque may not be applied. Alternatively, the MG1 rotating speed may be set to zero by the d-axis locking of the first rotating electric machine MG1.

The first ring gear 13 rotates normally along with the second carrier 24. Since the first planetary gear mechanism 10 is in the neutral state where the clutch CL1 and the brake BK1 are released, the engine 1 is not rotated, and the rotation of the first carrier 14 is stopped. Accordingly, a large regeneration amount may be obtained. The first sun gear 11 rotates reversely in the revolution state. Furthermore, the neutral state of the first planetary gear mechanism 10 is a state where no power is transmitted between the first ring gear 13 and the first carrier 14, that is, the engine 1 and the second planetary gear mechanism 20 are separated from each other so that the transmission of the power is interrupted. When the first planetary gear mechanism 10 engages with at least one of the clutch CL1 and the brake BK1, a connection state is realized in which the engine 1 is connected to the second planetary gear mechanism 20.

There is a case where the regeneration energy is not obtained due to the full charge state of the battery when the vehicle travels in the single motor EV mode. In this case, it is considered that an engine brake is simultaneously used. When the engine 1 is connected to the drive wheel 32 by the engagement of the clutch CL1 or the brake BK1, the engine brake may be applied to the drive wheel 32. As indicated by the triangle of FIG. 3, when the clutch CL1 or the brake BK1 is engaged in the single motor EV mode, the engine 1 is rotated, and the engine rotating speed is increased by the first rotating electric machine MG1 so that the engine brake state is realized.

Figure 5:
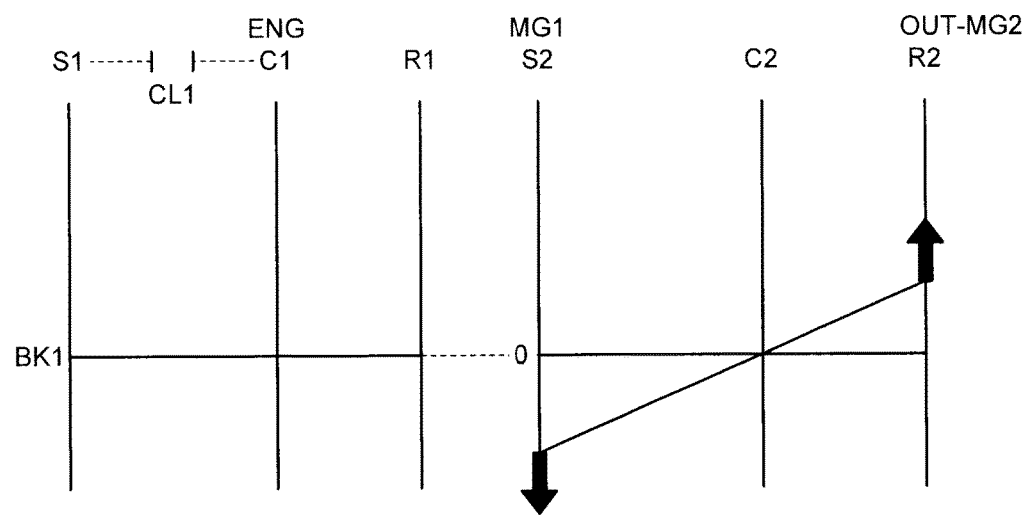
FIG. 5 is an alignment chart according to a dual motor EV mode.

In the dual motor EV mode, the HV_ECU 50 engages the clutch CL1 and the brake BK1. FIG. 5 is an alignment chart according to the dual motor EV mode. When the clutch CL1 is engaged, the differential operation of the first planetary gear mechanism 10 is regulated. Meanwhile, when the brake BK1 is engaged, the rotation of the first sun gear 11 is regulated. Accordingly, the rotation of all rotation components of the first planetary gear mechanism 10 is stopped. Since the rotation of the first ring gear 13 as the output component is regulated, the rotation of the second carrier 24 connected thereto is locked to zero.

The HV_ECU 50 outputs a travel driving torque to each of the first rotating electric machine MG1 and the second rotating electric machine MG2. Since the rotation of the second carrier 24 is regulated, a reaction force is obtained with respect to the torque of the first rotating electric machine MG1, and hence the torque of the first rotating electric machine MG1 may be output from the second ring gear 23. The first rotating electric machine MG1 can output a positive torque from the second ring gear 23 in a manner such that the first rotating electric machine rotates reversely by outputting a negative torque in the forward moving direction. Meanwhile, the first rotating electric machine MG1 can output a negative torque from the second ring gear 23 in a manner such that the first rotating electric machine rotates normally by outputting a positive torque in the backward moving direction.

Figure 6:
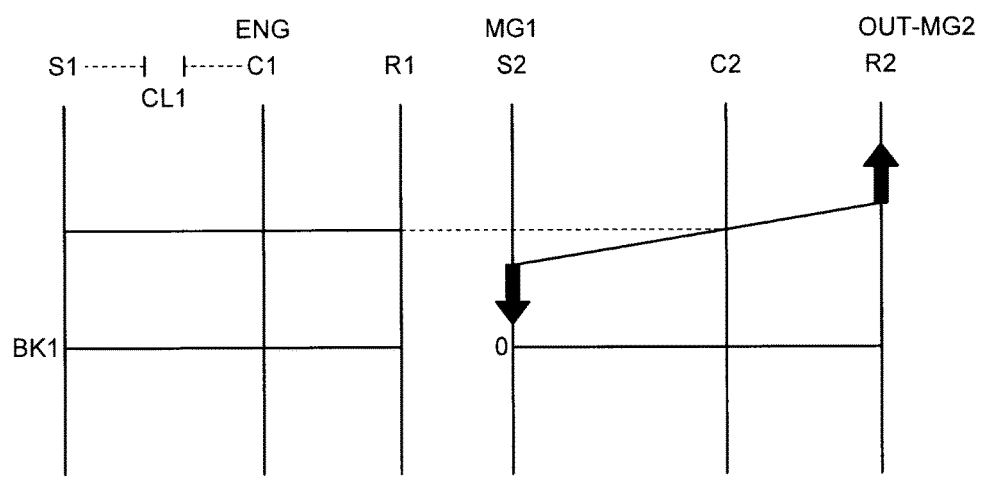
FIG. 6 is an alignment chart according to a low HV travel mode.
Figure 7:
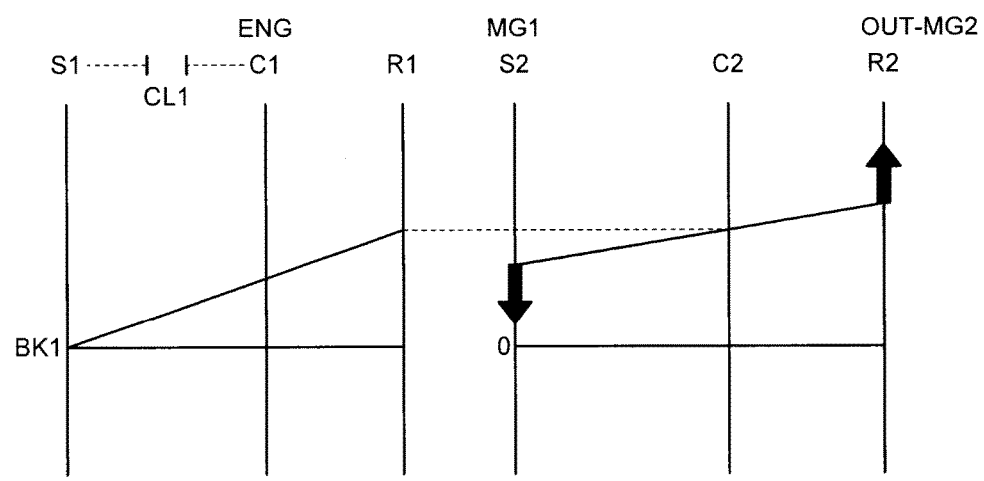
FIG. 7 is an alignment chart according to a high HV travel mode.

In the HV travel mode, the first planetary gear mechanism 10 of the transmission unit is switched to the low/high state based on the differential state of the second planetary gear mechanism 20 as the differential unit. FIG. 6 is an alignment chart according to the HV travel mode (hereinafter, referred to as the "HV low mode") in the low state, and FIG. 7 is an alignment chart according to the HV travel mode (hereinafter, referred to as the "HV high mode") in the high state.

In the HV low mode, the HV_ECU 50 engages the clutch CL1 and releases the brake BK1. When the clutch CL1 is engaged, the differential operation of the first planetary gear mechanism 10 is regulated, so that the rotation components 11, 13, and 14 rotate together. Accordingly, the rotation of the engine 1 is transmitted from the first ring gear 13 to the second carrier 24 at the constant rotating speed without increasing or decreasing the rotating speed.

Meanwhile, in the HV high mode, the HV_ECU 50 releases the clutch CL1 and engages the brake BK1. When the brake BK1 is engaged, the rotation of the first sun gear 11 is regulated. Accordingly, the first planetary gear mechanism 10 becomes an overdrive (OD) state in which the rotation of the engine 1 input to the first carrier 14 is increased in speed and is output from the first ring gear 13. In this way, the first planetary gear mechanism 10 can output the rotation of the engine 1 while increasing the rotating speed thereof. The transmission gear ratio of the first planetary gear mechanism 10 in the overdrive state can be set to, for example, 0.7.

In this way, the switching device including the clutch CL1 and the brake BK1 shifts the first planetary gear mechanism 10 by switching a state where the differential operation of the first planetary gear mechanism 10 is regulated and a state where the differential operation of the first planetary gear mechanism 10 is allowed. The driving device 1-1 for a hybrid vehicle can switch the HV high mode and the HV low mode by the transmission unit including the first planetary gear mechanism 10, the clutch CL1, and the brake BK1, and can improve the transmission efficiency of the vehicle 100. Further, the second planetary gear mechanism 20 as the differential unit is connected in series to the rear stage of the transmission unit. Since the first planetary gear mechanism 10 is in the overdrive state, there is an advantage that the torque of the first rotating electric machine MG1 does not need to be a high torque.

(Mode Selection)

Figure 8:
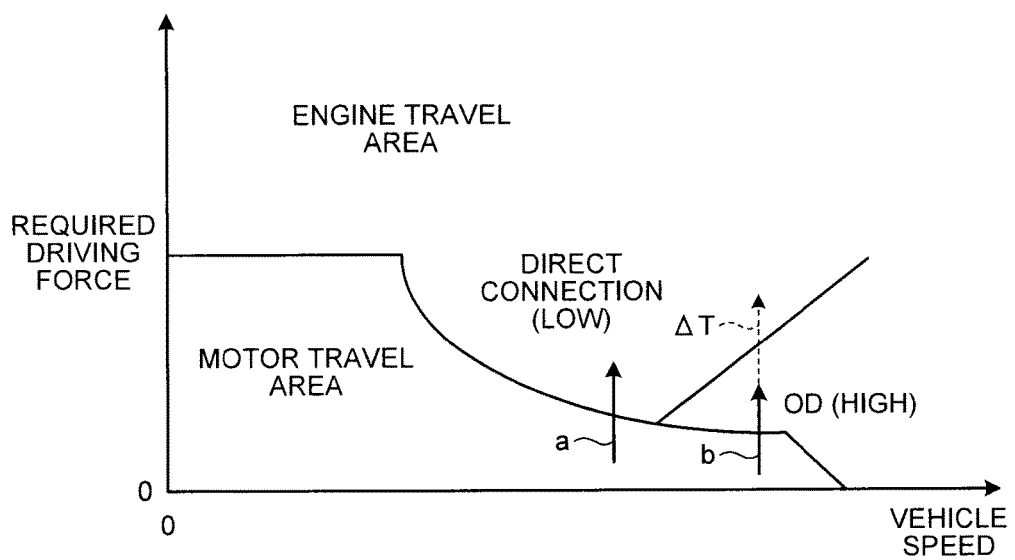
FIG. 8 is a diagram illustrating a map according to a mode selection of the embodiment.
Figure 9:
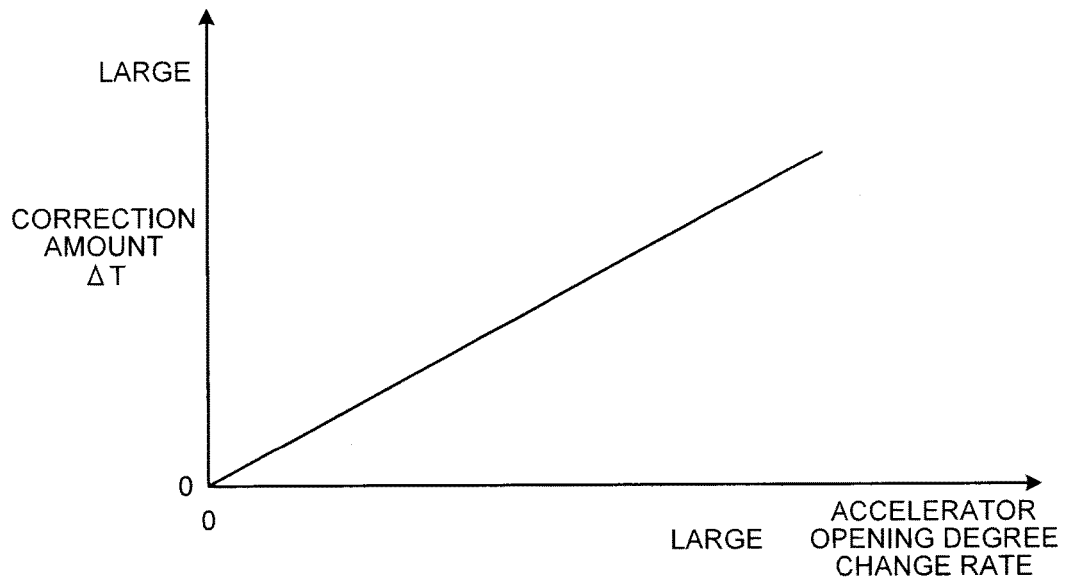
FIG. 9 is a diagram illustrating a correction amount when a mode is selected.

For example, the HV_ECU 50 selects the HV high mode at the high vehicle speed and selects the HV low mode at the middle/low vehicle speed. Here, the selection of the gear shift stage (mode) using the HV_ECU 50 will be described with reference to FIGS. 8 and 9. FIG. 8 is a diagram illustrating a map according to the mode selection of the embodiment, and FIG. 9 is a diagram illustrating a correction amount when a mode is selected. In FIG. 8, the horizontal axis indicates the vehicle speed, and the vertical axis indicates the required driving force. The required driving force is estimated based on, for example, the accelerator opening degree. In FIG. 9, the horizontal axis indicates the accelerator opening degree change rate, and the vertical axis indicates the correction amount.

In the embodiment, the HV_ECU 50 selects a mode with reference to, for example, the map illustrated in FIG. 8. As illustrated in the map of FIG. 8, a low-load area in which the vehicle speed is low and the required driving force is small is a motor travel area. In the motor travel area, for example, a single motor EV mode is selected in the low-load state and a dual drive EV mode is selected in the high load state. In the single motor travel mode, since the clutch CL1 and the brake BK1 are released so that the transmission unit becomes the neutral state, the rotating speed of the engine is zero and the dragging loss of the first rotating electric machine MG1 decreases.

An area having a high vehicle speed or a high load compared to the motor travel area is an engine travel area. The engine travel area is further divided into a direct connection (low) area and an OD (high) area. The direct connection area is an engine travel area in which the HV low mode is selected. The OD area is an engine travel area in which the HV high mode is selected. The OD area is an area of a high vehicle speed, and the direct connection area is an area of a low/middle vehicle speed. The direct connection area is set to a high load side compared to the OD area. Since the transmission unit is maintained in an overdrive state when the vehicle speed is high and the load is low, the fuel economy can be improved.

Here, when the required driving force increases as indicated by the arrows a and b of FIG. 8, the HV_ECU 50 switches the travel mode of the vehicle 100 from the EV travel mode to the HV travel mode. The switching to any one of the HV low mode and the HV high mode in the HV travel mode depends on the vehicle speed. In the case of the middle/low vehicle speed as indicated by the arrow a illustrated in FIG. 8, the state is switched to the direct connection area so that the HV low mode is selected. Meanwhile, in the case of the high vehicle speed as indicated by the arrow b illustrated in FIG. 8, the state is switched to the OD area so that the HV high mode is selected.

Further, the mode can be selected by adding the correction amount to the required driving force increase amount. For example, the correction amount $\Delta T$ can be calculated based on the accelerator opening degree change rate with reference to, for example, the map illustrated in FIG. 9. As illustrated in FIG. 9, the correction amount $\Delta T$ increases as the accelerator opening degree change rate increases. In FIG. 8, it is estimated whether any one of the direct connection area and the OD area is selected after the correction amount $\Delta T$ is added to the accelerator opening degree (the required driving force) changed from the motor travel area to the engine travel area. For example, the HV high mode is selected in a change in the required driving force indicated by the arrow b of FIG. 8, but when the correction amount $\Delta T$ calculated based on the accelerator opening degree change rate is added to the change, the state may be changed from the OD area to the direct connection area at the high load side. In this case, the selected travel mode is switched to the HV low mode.

Figure 10:
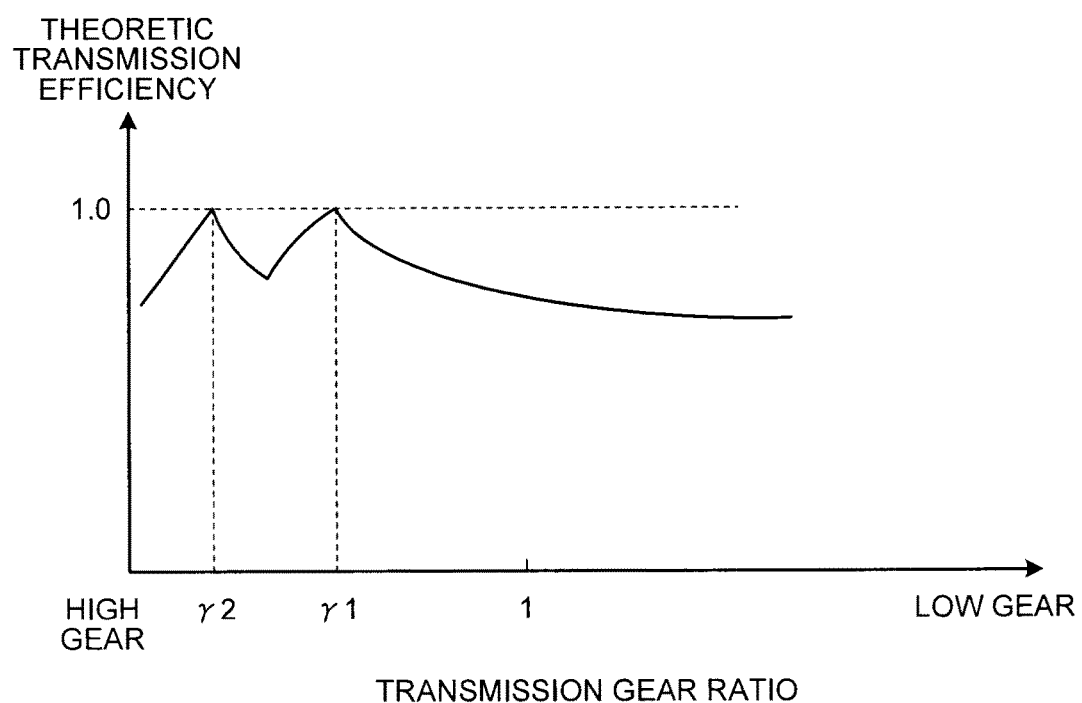
FIG. 10 is a diagram illustrating a theoretic transmission efficiency line according to the embodiment.

In the embodiment, since the rotation of the engine 1 is output while the rotating speed thereof is changed by the selection of the HV high mode and the HV low mode, two mechanical points exist, and hence the fuel economy can be improved. FIG. 10 is a diagram illustrating a theoretic transmission efficiency line according to the embodiment.

In FIG. 10, the horizontal axis indicates the transmission gear ratio, and the vertical axis indicates the theoretic transmission efficiency. Here, the transmission gear ratio indicates the ratio (the deceleration ratio) of the input side rotating speed with respect to the output side rotating speed of the planetary gear mechanisms 10 and 20. For example, the transmission gear ratio indicates the ratio of the rotating speed of the first carrier 14 with respect to the rotating speed of the second ring gear 23. In the horizontal axis, the left side indicates a high gear side having a small transmission gear ratio, and the right side indicates a low gear side having a large transmission gear ratio. Regarding the theoretic transmission efficiency, the maximum efficiency is 1.0 when the power input to the planetary gear mechanisms 10 and 20 is entirely transmitted to the counter drive gear 25 through the mechanical transmission without using the electric path.

The curve of FIG. 10 indicates the theoretic transmission efficiency line in the HV travel mode when the HV high mode and the HV low mode are appropriately switched. For example, the high efficient mode is selected from any one of the HV high mode and the HV low mode at the same transmission gear ratio. The relatively-right side indicates the theoretic transmission efficiency line in the HV low mode, and the left side indicates the theoretic transmission efficiency line in the HV high mode. The transmission efficiency of the HV low mode is maximal at the transmission gear ratio $\gamma1$. At the transmission gear ratio $\gamma1$, the rotating speed of the first rotating electric machine MG1 (the second sun gear 21) is 0. For this reason, the electric path caused by the reaction force with respect to the first rotating electric machine MG1 is zero at the transmission gear ratio $\gamma1$, and power can be transmitted from the engine 1 to the counter drive gear 25 only by the transmission of the mechanical power. The transmission gear ratio $\gamma1$ is an overdrive side transmission gear ratio, that is, a transmission gear ratio smaller than 1. In the specification, the transmission gear ratio $\gamma1$ is referred to as the "first mechanical transmission gear ratio $\gamma1$".

The theoretic transmission efficiency of the HV high mode is maximal at the transmission gear ratio $\gamma2$. In the HV high mode, the rotating speed of the first rotating electric machine MG1 (the second sun gear 21) at the transmission gear ratio $\gamma2$ is zero, and power can be transmitted from the engine 1 to the counter drive gear 25 only by the transmission of the mechanical power. The transmission gear ratio $\gamma2$ is a high gear side transmission gear ratio in relation to the first mechanical transmission gear ratio $\gamma1$. In the specification, the transmission gear ratio $\gamma2$ is referred to as the "second mechanical transmission gear ratio $\gamma2$".

The theoretic transmission efficiency of the HV travel mode decreases as the transmission gear ratio becomes a low gear side value in relation to the first mechanical transmission gear ratio $\gamma1$. Further, the theoretic transmission efficiency of the HV travel mode decreases as the transmission gear ratio becomes a high gear side value in relation to the second mechanical transmission gear ratio $\gamma2$. The theoretic transmission efficiency of the HV travel mode is curved to the low efficiency side in the area of the transmission gear ratio between the first mechanical transmission gear ratio $\gamma1$ and the second mechanical transmission gear ratio $\gamma2$.

In this way, the driving device 1-1 for a hybrid vehicle according to the embodiment includes two mechanical points at the high gear side in relation to the transmission gear ratio 1. Since the driving device 1-1 for a hybrid vehicle includes the transmission unit with the first planetary gear mechanism 10, the clutch CL1, and the brake BK1, it is possible to generate a second mechanical point (a second mechanical transmission gear ratio $\gamma2$) at the high gear side in relation to the mechanical point (the first mechanical transmission gear ratio $\gamma1$) in the case where the engine 1 is directly connected to the second carrier 24. Accordingly, it is possible to improve the transmission efficiency during the operation of the high gear. That is, it is possible to realize a hybrid system capable of improving the fuel economy by the improvement of the transmission efficiency when the vehicle travels at a high speed.

Further, the driving device 1-1 for a hybrid vehicle can regulate the rotation of the input component of the second planetary gear mechanism 20 by engaging the clutch CL1 and the brake BK1 of the transmission unit, and hence can cause the vehicle to travel in the dual motor EV mode. For this reason, there is no need to provide a separate clutch or the like in order to realize the dual motor EV mode, and hence the configuration is simplified. In the layout of the embodiment, a large deceleration ratio of the second rotating electric machine MG2 can be obtained. Further, a compact arrangement can be realized by the FF or RR layout.

(Backward Travel)

When the vehicle travels backward while the engine is used as a power source, the first rotating electric machine MG1 as a generator generates electric power, and the second rotating electric machine MG2 as a motor performs a power running operation that a negative torque is output by the reverse rotation thereof. When the battery charging state is sufficient, only the second rotating electric machine MG2 may rotate reversely in the single drive EV mode so that the vehicle travels while the motor is used a drive source. Further, the vehicle may travel backward in the dual drive EV mode by fixing the second carrier 24.

(Cooperative Gear Shift Control)

When the HV_ECU 50 switches the HV high mode and the HV low mode, a cooperative gear shift control of simultaneously shifting the first planetary gear mechanism 10 and the second planetary gear mechanism 20 can be performed. In the cooperative gear shift control, the HV_ECU 50 increases one transmission gear ratio of the first planetary gear mechanism 10 and the second planetary gear mechanism 20 and decreases the other transmission gear ratio.

When the HV_ECU 50 switches the HV high mode to the HV low mode, the transmission gear ratio of the second planetary gear mechanism 20 is changed to the high gear side in synchronization with the switching of the mode. Thus, it is possible to suppress a change in transmission gear ratio by suppressing or reducing a non-continuous change in the entire transmission gear ratio from the engine 1 of the vehicle 100 to the drive wheel 32. Since a change in the transmission gear ratio from the engine 1 to the drive wheel 32 is suppressed, the engine rotating speed adjustment amount can be decreased or the engine rotating speed does not need to be adjusted in the gear shift operation. For example, the HV_ECU 50 shifts the first planetary gear mechanism 10 and the second planetary gear mechanism 20 in the cooperation state so that the transmission gear ratio of the entire vehicle 100 is continuously changed to the low gear side.

Meanwhile, when the HV_ECU 50 switches the HV low mode to the HV high mode, the transmission gear ratio of the second planetary gear mechanism 20 is changed to the low gear side in synchronization with the switching of the mode. Thus, it is possible to decrease a change in transmission gear ratio by suppressing or reducing a non-continuous change in the transmission gear ratio of the entire vehicle 100. For example, the HV_ECU 50 shifts the first planetary gear mechanism 10 and the second planetary gear mechanism 20 in the cooperation state so that the transmission gear ratio of the entire vehicle 100 is continuously changed to the high gear side.

The adjustment of the transmission gear ratio of the second planetary gear mechanism 20 is performed by, for example, the control of the rotating speed of the first rotating electric machine MG1. For example, the HV_ECU 50 controls the first rotating electric machine MG1 so that the transmission gear ratio between the input shaft 2 and the counter drive gear 25 is continuously changed. Thus, the entire transmission device including the planetary gear mechanisms 10 and 20, the first rotating electric machine MG1, the clutch CL1, and the brake BK1, that is, the transmission device including the differential unit and the transmission unit is operated as an electric continuously variable transmission. Since the range of the transmission gear ratio of the transmission device including the differential unit and the transmission unit is wide, the transmission gear ratio from the differential unit to the drive wheel 32 is comparatively large. Further, the circulation of power is reduced when the vehicle travels at the high vehicle speed in the HV travel mode.

(Engine Start-Up Control)

In the case where the engine 1 is started from the single motor EV mode, the clutch CL1 or the brake BK1 is engaged (including the slip engagement state), the engine rotating speed is increased by the first rotating electric machine MG1, and the ignition is performed. At this time, the rotating speed of the second carrier 24 (the first ring gear 13) may become zero by the control of the rotating speed of the first rotating electric machine MG1 before the clutch CL1 or the brake BK1 is engaged. Further, a reaction torque is generated in a direction in which the travel driving force is decreased when the engine rotating speed is increased by the MG1 torque. The HV_ECU 50 may additionally output a reaction force cancel torque that cancels the reaction torque to the second rotating electric machine MG2. Furthermore, in the case where the engine 1 is a direct injection engine which may be started up independently, the engine 1 may be started up independently and the independent start-up of the engine 1 may be assisted by the MG1 torque.

Figure 11:
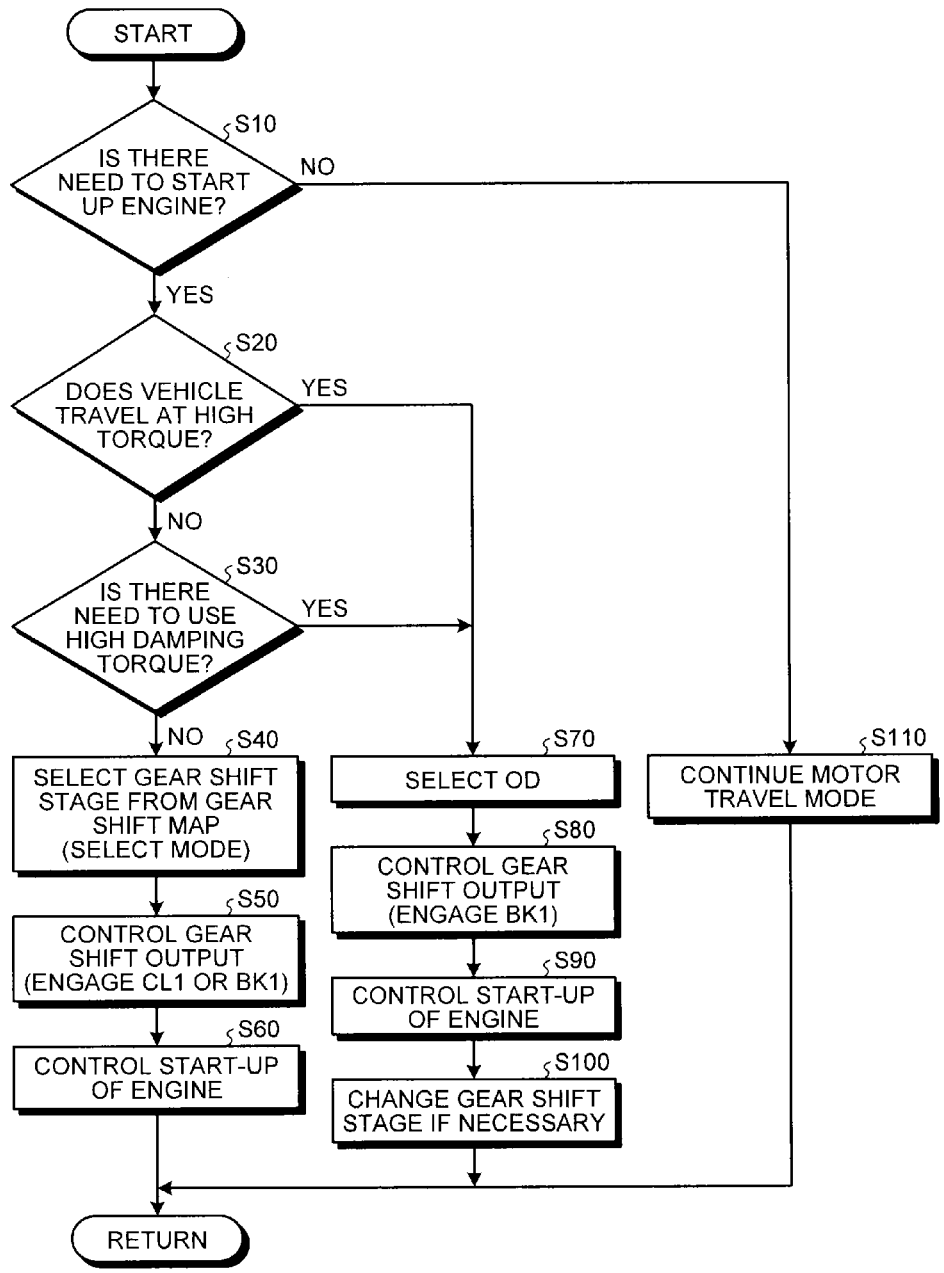
FIG. 11 is a flowchart according to an engine start-up control of the embodiment.
Figure 12:
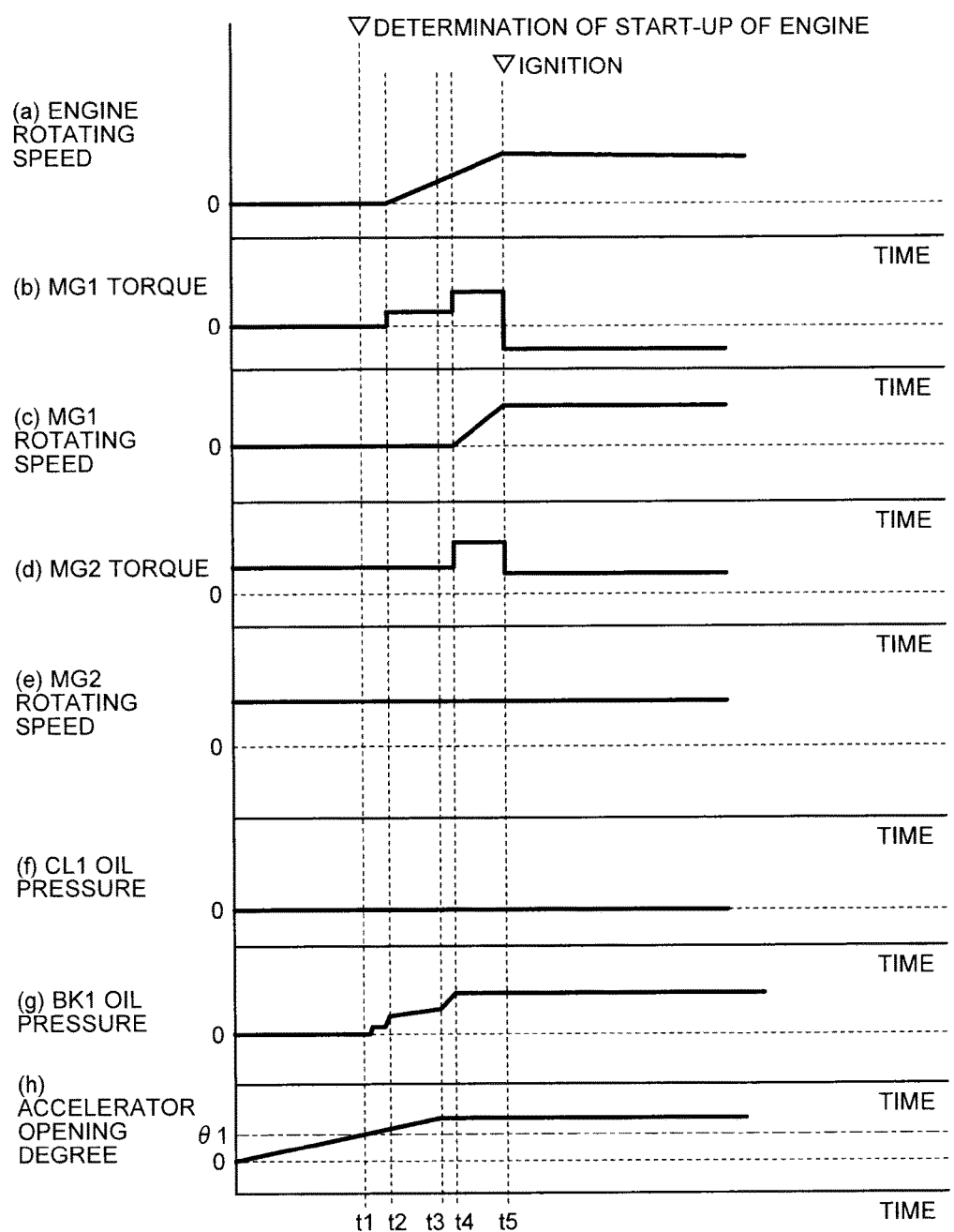
FIG. 12 is a time chart according to the engine start-up control of the embodiment.

Next, the engine start-up control of the driving device 1-1 for a hybrid vehicle according to the embodiment will be described with reference to FIGS. 11 and 12. FIG. 11 is a flowchart according to the engine start-up control of the embodiment, and FIG. 12 is a time chart according to the engine start-up control of the embodiment. In FIG. 12, (a) indicates the rotating speed of the engine, (b) indicates the torque of the first rotating electric machine MG1, (c) indicates the rotating speed of the first rotating electric machine MG1, (d) indicates the torque of the second rotating electric machine MG2, (e) indicates the rotating speed of the second rotating electric machine MG2, (f) indicates the hydraulic pressure of the clutch CL1, (g) indicates the hydraulic pressure of the brake BK1, and (h) indicates the accelerator opening degree. The control flow illustrated in FIG. 11 is performed by the HV_ECU 50, for example, when the vehicle travels in the EV travel mode. The time chart illustrated in FIG. 12 illustrates an example of the switching from the single motor EV mode of the second rotating electric machine MG2 to the HV high mode thereof.

Particularly, in the embodiment, the HV_ECU 50 may select the overdrive state (the HV high mode) having a small necessary torque at the gear shift stage of the transmission unit when the engine 1 is started up in high load state of the first rotating electric machine MG1. Furthermore, the high load state of the rotating electric machine indicates a state where the ratio of the torque necessary for the start-up of the engine increases with respect to the maximum torque output from the rotating electric machine. Specifically, as illustrated in FIG. 11, the high load state can include a state where the high damping torque is needed when the vehicle travels at a high torque or a state where the output of the rotating electric machine is limited.

In step S10, it is determined whether to start up the engine 1 or not. The HV_ECU 50 may determine whether to start up the engine or not using, for example, various travel conditions such as an increase in the required driving force including an increase in the accelerator stepping amount (the accelerator opening degree) as a judgment condition. When it is determined that the engine needs to be started up as the determination result of step S10 (Yes in step S10), the routine proceeds to step S20. Meanwhile, when it is determined that the engine does not need to be started up (No in step S10), the routine proceeds to step S110. In FIG. 12, the engine start-up determination is performed at the time t1, and a positive determination is performed based on the trigger activated when the accelerator opening degree exceeds a threshold value θ1.

In step S20, it is determined whether the vehicle travels at a high torque in the motor travel mode. The determination on the high torque travel state can be performed based on, for example, the torque output from the rotating electric machine compared to the torque obtained by subtracting the torque for increasing the rotating speed from the maximum torque output from the rotating electric machine. When it is determined that the vehicle travels at a high torque as the determination result of step S20 (Yes in step S20), the routine proceeds to step S70. Meanwhile, when it is determined that the vehicle does not travel at a high torque (No in step S20), the routine proceeds to step S30. In FIG. 12, it is determined that the vehicle travels at a high torque by referring to the MG1 torque and the MG1 rotating speed at the time t1.

In step S30, it is determined whether to use a high damping torque in the damping control which is performed to reduce a shock when the vehicle travels in the motor travel mode or after the start-up of the engine. The state that needs the high damping torque indicates, for example, a case where the engine water temperature is lower than a predetermined value. In this case, the cylinder compression reaction force of the engine 1 increases with an increase in the viscosity of the engine oil. Similarly, a case can be exemplified in which the engine stop position is out of a predetermined range. This is because the cylinder compression reaction force changes in response to the stop position. For this reason, a state that needs the high damping torque can be determined based on the engine water temperature or the engine crank angle. When it is determined that the high damping torque is needed as the determination result of step S30 (Yes in step S30), the routine proceeds to step S70. Meanwhile, when it is determined that the high damping torque is not needed (No in step S30), the routine proceeds to step S40.

In step S40, the gear shift stage of the transmission unit during the start-up of the engine is determined by the travel condition used to determine the switching from the motor travel mode to the HV travel mode. For example, as the "mode selection" is described with reference to FIGS. 8 and 9, the HV_ECU 50 selects the gear shift stage (mode) with reference to the gear shift map exemplified in FIGS. 8 and 9. In the embodiment, any one of two modes, that is, the HV low mode and the HV high mode is selected. When the process of step S40 is performed, the routine proceeds to step S50.

In step S50, the gear shift output of the transmission unit is controlled based on the result selected in step S40. The HV_ECU 50 engages the clutch CL1 or the brake BK1 in response to the gear shift stage (mode) selected in step S40. For example, as illustrated in FIG. 3, when the HV low mode is selected in step S40, the engagement control of the clutch CL1 is performed in order to realize the HV low mode by the transmission. Further, when the HV high mode is selected in step S40, the engagement control of the brake BK1 is performed in order to realize the HV high mode by the transmission. When the process of step S50 is performed, the routine proceeds to step S60.

In step S60, the engine start-up control is performed. The engine start-up control will be described in detail below by the description of step S90. When the process of step S60 is performed, the control flow ends.

In step S70, when it is determined that the vehicle travels at a high torque in step S20 or when it is determined that a high damping torque is needed in step S30, the overdrive (OD) state is selected as the gear shift stage of the transmission unit during the start-up of the engine. When the gear shift stage is selected in this step, the OD is forcedly selected without referring to the gear shift map as in step S40. When the process of step S70 is performed, the routine proceeds to step S80. Furthermore, in FIG. 12, the OD is selected at the time t1 in the gear shift stage during the start-up of the engine.

In step S80, the gear shift output of the transmission unit is controlled based on the result selected in step S70. In step S70, since the overdrive (OD) state is forcedly selected as the gear shift stage of the transmission unit during the start-up of the engine, the HV_ECU 50 performs the engagement control of the brake BK1 in order to realize the OD (the HV high mode). In the embodiment, the OD is selected at the time point in which the brake BK1 becomes the slip engagement state. When the process of step S80 is performed, the routine proceeds to step S90. In FIG. 12, the engagement control of the brake BK1 is performed from the time t1 to the time t4. More specifically, the engagement operation of the brake BK1 is started from the time t1 to the time t2, the brake BK1 becomes the slip engagement state from the time t2 to the time t4, and the brake BK1 becomes the full engagement state at the time t4. Since the OD is selected at the time t2, the process of step S90 may be performed.

In step S90, the engine start-up control is performed. The HV_ ECU 50 increases the rotating speed of the engine by the first rotating electric machine MG1, and ignites the engine 1. Further, since a reaction torque is generated in a direction in which the travel driving force is decreased when the rotating speed of the engine is increased by the MG1 torque, the HV_ECU 50 additionally outputs a reaction cancel torque that cancels the reaction torque to the second rotating electric machine MG2. When the process of step S90 is performed, the routine proceeds to step S100.

The process of step S90 can be started at the time point in which the brake BK1 becomes the slip engagement state in step S80. That is, the processes of step S80 and step S90 are performed at the same time while the brake BK1 becomes the slip engagement state. In FIG. 12, since the rotating speed of the engine increases by the slip engagement of the brake BK1 during the period from the time t2 to the time t4, that is, the period in which the brake BK1 becomes the slip engagement state, the reaction force is received by outputting the MG1 torque from the first rotating electric machine MG1. Further, in this section, the MG1 rotating speed is maintained at zero. In this section, the engagement operation of the brake BK1 of step S80 is also performed together. The MG1 torque of the first rotating electric machine MG1 is increased and output after the time t4, that is, the full engagement of the brake BK1, and hence the rotating speed of the engine is increased. Further, at this time, the second rotating electric machine MG2 outputs a torque by adding the reaction force thereto in order to solve the reaction torque in a direction in which the travel driving force is decreased. Then, when the rotating speed of the engine becomes a predetermined value at the time t5, the engine 1 is ignited.

The engine start-up control is performed in the section from the time point at which the rotating speed of the engine starts to increase from zero at the time t2 to the time point at which the engine 1 is ignited at the time t5. In the embodiment, the "engine start-up state" can be set as the period of the engine start-up control. In the period of the engine start-up control (during the start-up of the engine), the gear shift stage is set to the OD state, the brake BK1 becomes the slip engagement state from the time t2 to the time t4, and the brake BK1 becomes the full engagement state at the time t4. That is, the state where the gear shift stage of the transmission unit is switched to the OD state during the start-up of the engine includes a case where the brake BK1 becomes not only the full engagement state, but also the slip engagement state.

In step S100, the gear shift stage is changed if necessary. Specifically, the gear shift stage (mode) of the transmission unit during the start-up of the engine is selected first by referring to the gear shift map exemplified in FIGS. 8 and 9 similarly to step S40. When the gear shift stage is not the overdrive state (the HV high mode), but the direct connection state (the HV low mode), there is a concern that the driving force may not be sufficient after the start-up of the engine in the overdrive state. For this reason, the HV low mode as the gear shift stage is promptly selected. Meanwhile, when the gear shift stage selected by the gear shift map is the overdrive state, the overdrive state is continued without changing the gear shift stage. When the process of step S100 is performed, the control flow ends.

In step S110, when it is determined that the start-up of the engine is not needed in step S10, the motor travel mode is continued by continuing the single motor EV mode of the second rotating electric machine MG2. When the process of step S110 is performed, the control flow ends.

Furthermore, the determination reference may be changed in response to the vehicle speed of the vehicle 100 in the determination of the high torque travel state of step S20 and the determination of the high damping torque of step S30 in the flowchart of FIG. 11 so that the overdrive state selection degree may be changed. For example, the OD selection process of step S70 can be easily performed by easily performing a positive determination in step S20 and step S30 in the state where the vehicle speed is high and a comparatively large driving force is not required after the start-up of the engine. Further, the normal mode selection process of step S40 can be easily performed by easily performing a negative determination in step S20 and step S30 so that the OD state having a small driving force is not used as much as possible in the state where the vehicle speed is low and a comparatively large driving force is needed after the start-up of the engine.

Further, the MG1 rotating speed is maintained at zero when the brake BK1 is in the slip engagement state (the section from the time t2 to the time t4 of the time chart of FIG. 12) in the engine start-up control of step S90 of the flowchart of FIG. 11. However, instead of this configuration, a configuration may be employed in which the MG1 rotating speed is increased in the normal direction so that the rotating speed of the engine is increased fast. Thus, it is possible to shorten the time in which the rotating speed of the engine reaches the rotating speed at which the ignition may be performed. In contrast, a configuration may be employed in which the first rotating electric machine MG1 is rotated reversely when the brake BK1 is in the slip engagement state.

Further, in the time chart of FIG. 12, the switching of the second rotating electric machine MG2 from the single motor EV mode to the HV high mode is exemplified. However, the flowchart of FIG. 11 can be also applied to the case where the second rotating electric machine is switched from the dual motor EV mode to the HV high mode. In this case, the clutch CL1 is released from the state where both the clutch CL1 and the brake BK1 are engaged. At this time, the first rotating electric machine MG1 becomes the slip engagement state due to the release operation from the full engagement state of the clutch CL1 from the initial state where the MG1 torque is output in the reverse direction as illustrated in FIG. 5. Accordingly, as illustrated in FIG. 4, the torque first returns to zero, and a torque is output in the normal direction in order to further receive the reaction force.

Next, an effect of the driving device 1-1 for a hybrid vehicle of the embodiment will be described.

The driving device 1-1 for a hybrid vehicle of the embodiment includes the transmission unit capable of outputting the rotation of the engine 1 while changing the rotating speed thereof and the first rotating electric machine MG1. The first rotating electric machine MG1 is configured to supply a torque for increasing the rotating speed of the engine during the start-up of the engine 1 to the engine 1 through the transmission unit. When the engine 1 is started up in the high load state of the first rotating electric machine MG1, the gear shift stage of the transmission unit is switched to the overdrive state.

With this configuration, the gear shift stage of the transmission unit is switched to the overdrive state. Accordingly, when the transmission unit is used, the rotating speed of the engine can be increased at a low torque, and hence the torque necessary for the start-up of the engine can be decreased. For this reason, it is possible to supply a torque sufficient for starting up the engine even in the high load state of the first rotating electric machine MG1, and hence to appropriately start up the engine 1.

Further, in the driving device 1-1 for a hybrid vehicle of the embodiment, the gear shift stage of the transmission unit can be switched by the engagement or the release of the clutch CL1 and the brake BK1. Here, the state where the gear shift stage of the transmission unit is switched to the overdrive state includes the slip engagement state of the brake BK1. Thus, it is possible to start the engine start-up control before the full engagement of the brake BK1, and hence to shorten the engine start-up timing.

Further, in the driving device 1-1 for a hybrid vehicle of the embodiment, the high load state of the first rotating electric machine MG1 indicates a state where a high torque is used in the motor travel mode. Since a high torque is used in the motor travel mode, the torque of the rotating electric machine which can be used to start up the engine is not left. Even in such a case, when the gear shift stage of the transmission unit is switched to the overdrive state, the necessary torque can be decreased, and hence the engine 1 can be reliably started up.

Further, in the driving device 1-1 for a hybrid vehicle of the embodiment, the high load state of the first rotating electric machine MG1 indicates a state where a high damping torque is needed in the motor travel mode or after the start-up of the engine. As the damping torque that is used in the damping control performed in the motor travel mode or after the start-up of the engine increases, the torque of the rotating electric machine used for the start-up of the engine is not left. Even in such a case, when the gear shift stage of the transmission unit is switched to the overdrive state, the necessary torque can be decreased, and hence the engine 1 can be reliably started up.

Further, in the driving device 1-1 for a hybrid vehicle of the embodiment, the gear shift stage used in the travel mode using the engine 1 is selected after the transmission unit is switched to the overdrive state and the engine 1 is started up. Thus, it is possible to prevent the insufficient driving state after the selection of the travel mode using the engine 1, and hence to smoothly change the drive source from the rotating electric machine to the engine 1.

Furthermore, in the embodiment, the engine start-up control using the first rotating electric machine MG1 has been exemplified. However, a configuration may be employed in which the engine start-up control is performed by the second rotating electric machine MG2, for example, as long as the second rotating electric machine MG2 can change the rotating speed and can increase the rotating speed of the engine regardless of the vehicle speed. In the embodiment, the engine start-up control in the high load state of the first rotating electric machine MG1 has been exemplified. However, the target of the "high load state" and the "state where the high torque is used in the motor travel mode" or the "state where the high damping torque is needed in the motor travel mode or after the start-up of the engine" as the detailed example thereof may be set as the second rotating electric machine MG2 instead of the first rotating electric machine MG1.

Modified Example of Embodiment

Figure 13:
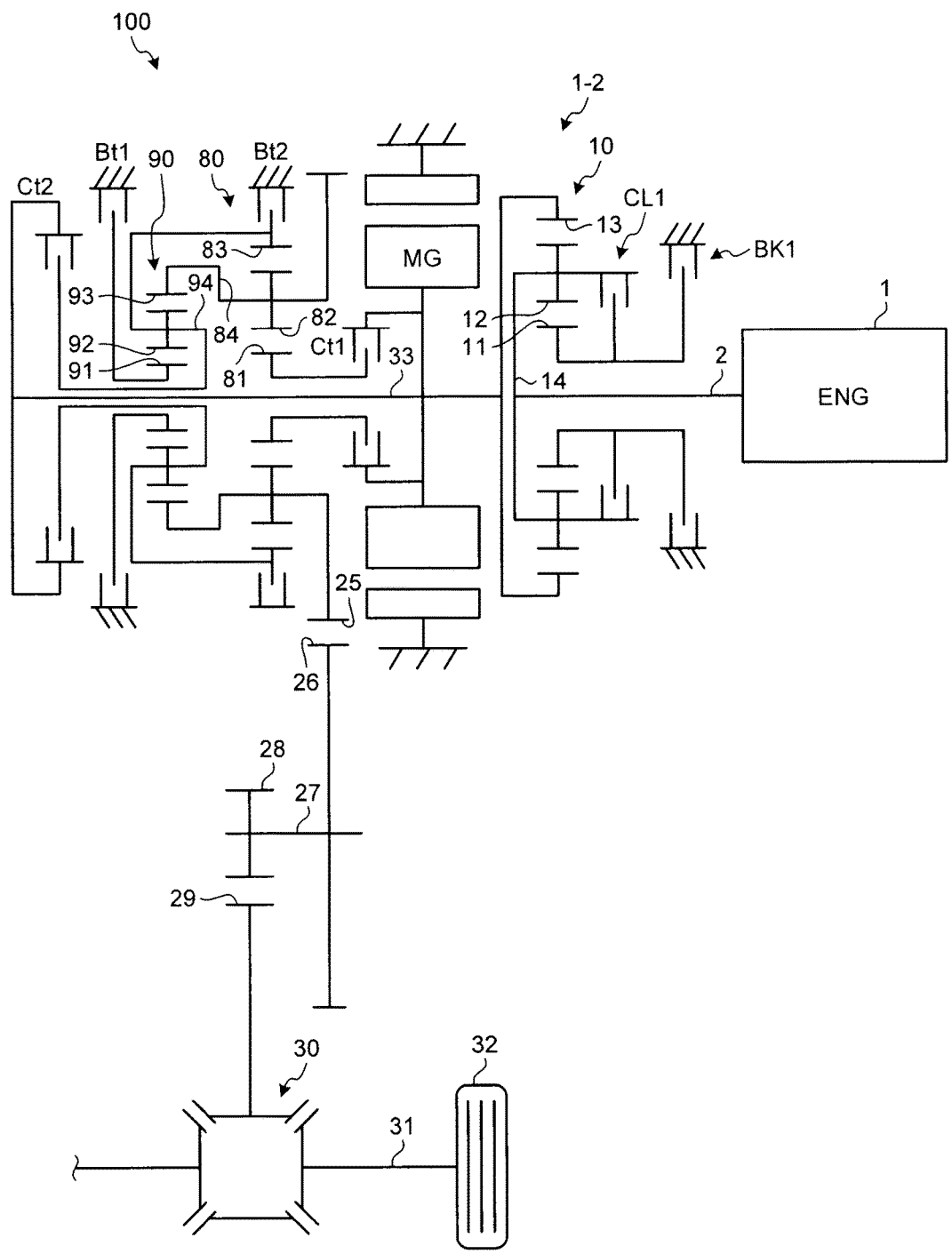
FIG. 13 is a skeleton diagram of a vehicle according to a modified example of the embodiment.

A modified example of the embodiment will be described with reference to FIGS. 13 to 15. FIG. 13 is a skeleton diagram of the vehicle according to the modified example of the embodiment, FIG. 14 is a diagram illustrating the engagement table of the second transmission unit of the driving device for a hybrid vehicle according to the modified example of the embodiment, and FIG. 15 is a diagram illustrating the operation engagement table of the first transmission unit of the driving device for a hybrid vehicle according to the modified example of the embodiment.

The driving device 1-1 for a hybrid vehicle of the above-described embodiment is a so-called dual motor type hybrid system that includes the engine 1, the first rotating electric machine MG1, and the second rotating electric machine MG2 as the power sources, but a driving device 1-2 for a hybrid vehicle of the modified example is a so-called single motor type hybrid system that includes the engine 1 and the single rotating electric machine MG as the power sources.

As illustrated in FIG. 13, the driving device 1-2 for a hybrid vehicle according to the modified example includes the first planetary gear mechanism 10, a third planetary gear mechanism 80, a fourth planetary gear mechanism 90, clutches CL1, Ct1, and Ct2, and brakes BK1, Bt1, and Bt2. The driving device 1-2 for a hybrid vehicle is of a single axis type in which the engine 1, the first planetary gear mechanism 10, the rotating electric machine MG, the third planetary gear mechanism 80, and the fourth planetary gear mechanism 90 are coaxially disposed. Even the driving device 1-2 for a hybrid vehicle can be applied to the FF vehicle or the RR vehicle.

In the driving device 1-2 for a hybrid vehicle according to the modified example, the first transmission unit includes the first planetary gear mechanism 10, the clutch CL1, and the brake BK1. The configuration of the first transmission unit is the same as that of the transmission unit of the driving device 1-1 for a hybrid vehicle of the above-described embodiment. In the first transmission unit, for example, the clutch CL1 and the brake BK1 are selectively engaged or released in accordance with the operation engagement table of FIG. 15. Thus, in the first transmission unit, any one of the EV mode using the rotating electric machine MG as the power source and the HV high mode and the HV low mode using the engine 1 and the rotating electric machine MG as the power sources is selectively set. In the engagement table of FIG. 15, the circle of the section of the clutch CL1 and the section of the brake BK1 indicates the engagement state, and the blank indicates the release state. Further, the triangle indicates the engagement state of any one of the clutch CL1 and the brake BK1 and the release state of the other.

In the EV mode, both the clutch CL1 and the brake BK1 are released, and the engine 1 is separated from the driving device 1-2 for a hybrid vehicle, so that the power running operation of the rotating electric machine MG is performed. Thus, the EV power running/regeneration operation can be performed without dragging the engine 1 in the EV travel mode. Further, there is a case in which the regeneration energy is not obtained when the battery is fully charged in the EV travel mode. In this case, the engine brake may be simultaneously used. By the engagement of the clutch CL1 or the brake BK1, the engine 1 is connected to the drive wheel 32, and hence the engine brake can be exerted on the drive wheel 32. As indicated by the triangle of FIG. 15, when the clutch CL1 or the brake BK1 is engaged in the EV mode, the engine 1 is rotated, and the rotating speed of the engine is increased by the rotating electric machine MG so that the engine brake state can be set.

Further, in the driving device 1-2 for a hybrid vehicle, the second transmission unit includes the third planetary gear mechanism 80, the fourth planetary gear mechanism 90, the clutches Ct1 and Ct2, and the brakes Bt1 and Bt2. The third planetary gear mechanism 80 is of a single pinion type, and includes a third sun gear 81, a third pinion gear 82, a third ring gear 83, and a third carrier 84. Similarly, the fourth planetary gear mechanism 90 is also of a single pinion type, and includes a fourth sun gear 91, a fourth pinion gear 92, a fourth ring gear 93, and a fourth carrier 94.

The third sun gear 81 of the third planetary gear mechanism 80 can be connected to the rotation shaft 33 of the rotating electric machine MG by the clutch Ct1. That is, the third sun gear 81 is connected to or separated from the rotation shaft 33 of the rotating electric machine MG by the engagement/release of the clutch Ct1. Further, the first ring gear 13 of the first planetary gear mechanism 10 is connected to the rotation shaft 33 of the rotating electric machine MG. The third ring gear 83 can regulate the rotation by the brake Bt2. The counter drive gear 25 is connected to the third carrier 84.

The fourth ring gear 93 of the fourth planetary gear mechanism 90 is connected to the third carrier 84 of the third planetary gear mechanism 80. The fourth carrier 94 is connected to the third ring gear 83 of the third planetary gear mechanism 80. That is, when the brake Bt2 regulates the rotation of the third ring gear 83, the rotation of the fourth carrier 94 is also regulated in this way. Further, the fourth carrier 94 can be connected to the rotation shaft 33 of the rotating electric machine MG by the clutch Ct2. That is, the fourth carrier 94 is connected to or separated from the rotation shaft 33 of the rotating electric machine MG by the engagement/release of the clutch Ct2. The fourth sun gear 91 can regulate the rotation of the brake Bt1.

In the second transmission unit, for example, the clutches Ct1 and Ct2 and the brakes Bt1 and Bt2 are selectively engaged/released in accordance with the engagement table of FIG. 14. In the engagement table of FIG. 14, the circle indicates the engagement state, and the blank indicates the release state. Thus, the second transmission unit is selectively set to any one of the first gear shift stage to the fourth gear shift stage. Further, when the clutches Ct1 and Ct2 and the brakes Bt1 and Bt2 are released, a neutral state is set in which the transmission of the power to the drive wheel is interrupted. Further, since the vehicle travels backward by the reverse rotation of the rotating electric machine MG, the rear gear shift stage R is the same as the first gear shift stage. That is, the second transmission unit corresponds to a stepped automatic transmission (AT) that includes four gear shift stages respectively having predetermined transmission gear ratios.

In the single motor type hybrid system of the related art, the AT corresponding to the second transmission unit is generally connected to the rotating electric machine MG and the engine, and an engine separation clutch is provided on the connection path to the engine. Then, the vehicle can travel by using the rotating electric machine MG as the drive source while the dragging loss of the engine is reduced by the release of the clutch in the EV travel mode. In contrast, the driving device 1-2 for a hybrid vehicle of the embodiment may have a configuration in which the first transmission unit includes two functions, that is, the engine separation function and the two-stage gear shift function while the first transmission unit is disposed instead of the engine separation clutch of the related art. The driving device 1-2 for a hybrid vehicle can reduce the dragging loss of the engine without using the engine separation clutch as in the related art, and hence can appropriately perform the EV travel mode. Further, in the driving device 1-2 for a hybrid vehicle, the first transmission unit can be switched to the low/high speed gear shift stage in the engine travel mode, and the second transmission unit can be switched to the four gear shift stages. Accordingly, the number of the gear shift stages can be increased, and the gear shift stage appropriate for the travel state can be selected, so that the vehicle can travel efficiently. Particularly, the high-speed fuel economy can be improved.

Then, even in the driving device 1-2 for a hybrid vehicle according to the modified example, a problem arises in that the engine start-up torque may not be sufficiently obtained by the rotating electric machine MG during the start-up of the engine similarly to the driving device 1-1 for a hybrid vehicle of the embodiment. Even in the driving device 1-2 for a hybrid vehicle according to the modified example, this problem can be solved by setting the mode of the first transmission unit to the HV high mode in the high load state of the rotating electric machine MG similarly to the above-described embodiment.

While the embodiment of the present invention has been described, the above-described embodiment is merely an example, and is not intended to limit the scope of the present invention. The above-described embodiment can be implemented in various forms, and various omissions and substitutions can be made within the scope of the present invention. The above-described embodiment and the modification thereof are included in the scope of the present invention and are also included in the scope of the present invention of claims and the equivalent thereof.

In the above-described embodiment, the gear shift stage of the transmission unit is switched to the overdrive state when the engine is started up in the high load state of the rotating electric machine. However, the gear shift stage to be switched may be located at the high speed side compared to the selection stage of the related art, and hence the engine start-up torque may be decreased.

Further, in the above-described embodiment, a configuration has been exemplified in which the gear shift stage of the transmission unit (in the modified example, the first transmission unit) is switched to the overdrive state when the engine 1 is started up in the high load state of the first rotating electric machine MG1. However, a configuration in which the gear shift stage of the transmission unit is switched to the overdrive state at the low load state, that is, a configuration in which the gear shift stage is normally switched to the overdrive state during the start-up of the engine may be employed. In a single motor type hybrid system of a type (1MG-AT) obtained by the combination of a single rotating electric machine and an AT of the related art, a rear transmission (AT) is switched to a high speed stage in order to prevent the amplification of a shock during the start-up of the engine. However, in the driving devices 1-1 and 1-2 for a hybrid vehicle according to the embodiment, the transmission unit (the first transmission unit) is switched to the high speed stage with respect to the engine 1, and the engine can be easily started up by the first rotating electric machine MG1 (in the modified example, the rotating electric machine MG).

REFERENCE SIGNS LIST 1-1, 1-2 DRIVING DEVICE FOR A HYBRID VEHICLE
1 ENGINE
10 FIRST PLANETARY GEAR MECHANISM (TRANSMISSION UNIT)
11 FIRST SUN GEAR
13 FIRST RING GEAR
14 FIRST CARRIER
20 SECOND PLANETARY GEAR MECHANISM (DIFFERENTIAL UNIT)
21 SECOND SUN GEAR (SECOND ROTATION COMPONENT)
23 SECOND RING GEAR (THIRD ROTATION COMPONENT)
24 SECOND CARRIER (FIRST ROTATION COMPONENT)
32 DRIVE WHEEL
50 HV_ECU
60 MG_ECU
70 ENGINE_ECU
100 VEHICLE
BK1 BRAKE (ENGAGEMENT COMPONENT)
CL1 CLUTCH (ENGAGEMENT COMPONENT)
MG1 FIRST ROTATING ELECTRIC MACHINE (ROTATING ELECTRIC MACHINE)
MG2 SECOND ROTATING ELECTRIC MACHINE
MG ROTATING ELECTRIC MACHINE

The invention claimed is:

1. A driving device for a hybrid vehicle, comprising:
a transmission unit configured to output a rotation of an engine while changing a rotating speed of the engine; and
a rotating electric machine, wherein
the rotating electric machine is configured to supply a torque to the engine through the transmission unit for increasing the rotating speed of the engine at the time of starting up of the engine,
in a high load state of the rotating electric machine, the engine is started up with the transmission unit in an overdrive state, and
in a state other than the high load state, a gear shift stage of the transmission unit is selected in accordance with a travel condition of the hybrid vehicle and then the engine is started, and
the high load state of the rotating electric machine is a state where a high damping torque is needed while the hybrid vehicle travels by using the rotating electric machine, or a state where a high damping torque is needed after the starting up of the engine.

2. The driving device for a hybrid vehicle according to claim 1, wherein
the rotating electric machine is a first rotating electric machine,
the driving device further includes a differential unit configured to connect the transmission unit to drive wheels, and a second rotating electric machine,
an output shaft of the engine is connected to an input component of the transmission unit, and
the differential unit includes a first rotation component connected to an output component of the transmission unit, a second rotation component connected to the first rotating electric machine, and a third rotation component connected to the second rotating electric machine and the drive wheels.

3. The driving device for a hybrid vehicle according to claim 2, wherein
a high speed gear shift stage is in the overdrive state.

4. The driving device for a hybrid vehicle according to claim 3, wherein
the transmission unit is switched to a predetermined gear shift stage which is used while the vehicle travels by using the engine after the transmission unit is switched to the high speed gear shift stage and the engine is started up.

5. The driving device for a hybrid vehicle according to claim 2, wherein
the high load state of the first rotating electric machine is while the vehicle travels by using the first rotating electric machine.

6. The driving device for a hybrid vehicle according to claim 2, wherein
the high load state of the first rotating electric machine is after the starting up of the engine.

7. The driving device for a hybrid vehicle according to claim 2, wherein
the transmission unit is switched to a predetermined gear shift stage which is used while the vehicle travels by using the engine after the transmission unit is switched to a high speed gear shift stage and the engine is started up.

8. The driving device for a hybrid vehicle according to claim 1, wherein
a high speed gear shift stage is in the overdrive state.

9. The driving device for a hybrid vehicle according to claim 8, wherein
the transmission unit is switched to a predetermined gear shift stage which is used while the vehicle travels by using the engine after the transmission unit is switched to the high speed gear shift stage and the engine is started up.

10. The driving device for a hybrid vehicle according to claim 1, wherein
the high load state of the rotating electric machine is while the vehicle travels by using the rotating electric machine.

11. The driving device for a hybrid vehicle according to claim 10, wherein
the transmission unit is switched to a predetermined gear shift stage which is used while the vehicle travels by using the engine after the transmission unit is switched to a high speed gear shift stage and the engine is started up.

12. The driving device for a hybrid vehicle according to claim 1, wherein
the high load state of the rotating electric machine is after the starting up of the engine.

13. The driving device for a hybrid vehicle according to claim 12, wherein
the transmission unit is switched to a predetermined gear shift stage which is used while the vehicle travels by using the engine after the transmission unit is switched to a high speed gear shift stage and the engine is started up.

14. The driving device for a hybrid vehicle according to claim 1, wherein
the transmission unit is switched to a predetermined gear shift stage which is used while the vehicle travels by using the engine after the transmission unit is switched to a high speed gear shift stage and the engine is started up.

\* \* \* \* \*